United States Patent
Xu et al.

(10) Patent No.: US 11,261,101 B2
(45) Date of Patent: Mar. 1, 2022

(54) METHOD FOR PREPARING VANADIUM BATTERY ELECTROLYTE BY USING WASTE VANADIUM CATALYST

(71) Applicant: Hunan Sanfeng Vanadium Industry Co., Ltd., Huayuan (CN)

(72) Inventors: Xiaodi Xu, Suzhou (CN); Xingjiang Tian, Huayuan (CN)

(73) Assignee: Hunan Sanfeng Vanadium Industry Co., Ltd., Huayuan (CN)

( * ) Notice: Subject to any disclaimer, the term of this patent is extended or adjusted under 35 U.S.C. 154(b) by 400 days.

(21) Appl. No.: 16/558,901

(22) Filed: Sep. 3, 2019

(65) Prior Publication Data

US 2021/0061672 A1  Mar. 4, 2021

(51) Int. Cl.
*H01M 4/02* (2006.01)
*C01G 31/00* (2006.01)
*H01M 10/0562* (2010.01)
*C07F 9/00* (2006.01)

(52) U.S. Cl.
CPC ........ *C01G 31/00* (2013.01); *H01M 10/0562* (2013.01); *C07F 9/005* (2013.01); *H01M 2300/0068* (2013.01)

(58) Field of Classification Search
CPC ...................................................... H01M 4/02
See application file for complete search history.

(56) References Cited

U.S. PATENT DOCUMENTS

2013/0091989 A1* 4/2013 Sun ...................... C22B 34/225
75/739

* cited by examiner

*Primary Examiner* — Jacob B Marks
(74) *Attorney, Agent, or Firm* — Harness, Dickey & Pierce, P.L.C.

(57) ABSTRACT

The present invention discloses a method for preparing a vanadium battery electrolyte by using a waste vanadium catalyst. The method includes step A: soaking a waste vanadium catalyst in an oxalic acid solution for 2-8 h, to generate a solution containing vanadyl oxalate; step B: cleaning the waste vanadium catalyst, and collecting the vanadyl oxalate solution; and step C: adding a polyacid ester into the vanadyl oxalate solution; and after full reaction, removing impurities by filtration, and concentrating the filtrate to obtain a vanadyl oxalate mother solution. The method for preparing a vanadium battery electrolyte by using a waste vanadium catalyst according to the present invention does not generate wastes which cause environmental pollution in the treatment process, and can make a solution in the waste vanadium catalyst treatment process generate the electrolyte for preparing a vanadium battery. The process is simple and the treatment cost is low.

6 Claims, No Drawings

METHOD FOR PREPARING VANADIUM BATTERY ELECTROLYTE BY USING WASTE VANADIUM CATALYST

FIELD

The present invention relates to the technical field of preparation of vanadium battery electrolyte, and in particular to a method for preparing a vanadium battery electrolyte by using a waste vanadium catalyst.

BACKGROUND

At present, in the manufacture of sulfuric acid, fertilizer, gas, natural gas, petrochemical and other industries, a large amount of vanadium catalyst is required for catalysis, desulfuration, denitrification, and decarbonization. The vanadium catalyst used throughout the year ranges from 22,000 tons to 25,000 tons, and is on the rise year by year. However, in the process of using the vanadium catalyst, the original vanadium catalyst is made of vanadium pentoxide ($V_2O_5$). In the process of using the vanadium catalyst, the pentavalent vanadium is gradually reduced to the tetravalent vanadium. In order to meet the technical requirements of a device in a catalytic reaction, the vanadium catalyst must be frequently switched. There is a need to replace the waste vanadium catalyst. Although there are related methods for recovering the waste vanadium catalyst, it is difficult to achieve the intended purpose. It easily causes environmental pollution if the waste vanadium catalyst is not properly handled.

Harmful gases are emitted during constant humidity drying at 100° C. When the waste vanadium catalyst is crushed, a large amount of powdered toxic dust will damage people's health. After the waste vanadium is soaked by acid, wastewater and washing water have not been effectively centralized and recovered, and wastes in the process of recycling the waste vanadium catalyst cannot be digested.

In summary, conventionally, from the treatment and recovery of the waste vanadium catalyst and the production process of the vanadium electrolyte, pollutants are discharged into the environment, which easily pollutes the environment.

SUMMARY

An objective of the present invention is to provide a method for preparing a vanadium battery electrolyte by using a waste vanadium catalyst, to solve the problem of environmental pollution caused in an existing waste vanadium catalyst treatment process and by the vanadium battery electrolyte.

In order to achieve the aforementioned objective, the present invention provides a method for preparing a vanadium battery electrolyte by using a waste vanadium catalyst. The method includes the following steps:

step A: soaking a waste vanadium catalyst in an oxalic acid solution for 2-8 h, to generate a solution containing vanadyl oxalate;

step B: cleaning the waste vanadium catalyst, and collecting the vanadyl oxalate solution;

step C: adding a polyacid ester into the vanadyl oxalate solution; and after full reaction, removing impurities by filtration, and concentrating the filtrate to obtain a vanadyl oxalate mother solution; and step D: adding a sulfuric acid solution into the vanadyl oxalate mother solution to form a vanadyl sulfate solution, and after filtering, obtaining a vanadium electrolyte for preparing a vanadium battery.

Preferably, in the step C, a waste vanadium catalyst is further added to the vanadyl oxalate solution, and dried at 80-100° C. to obtain waste vanadium catalyst powder.

Preferably, the waste vanadium catalyst powder is calcined at 480-580° C. for 2-4 h to obtain a new vanadium catalyst.

Preferably, in the step A, the oxalic acid solution has a mass concentration of 20-50%, and the oxalic acid solution is formed by dissolving oxalic acid in water of 50-100° C.

Preferably, the vanadium electrolyte has a stack discharge efficiency of 75-85%.

Preferably, in the step D, sulfuric acid which is 1-3 times the mass of the vanadyl oxalate solution is added.

The present invention has the following advantages:

The method for preparing a vanadium battery electrolyte by using a waste vanadium catalyst according to the present invention does not generate wastes which cause environmental pollution in the treatment process, and can make a solution in the waste vanadium catalyst treatment process generate the electrolyte for preparing a vanadium battery. The process is simple and the treatment cost is low.

DETAILED DESCRIPTION

The following The following embodiments are intended to illustrate the present invention but are not intended to limit the scope of the present invention.

The specific embodiments of the present invention will be described in more detail below. The embodiments are provided to provide a more thorough understanding of the present invention, and the scope of the present invention can be fully conveyed to those skilled in the art.

The term "comprise" or "include" as used throughout the specification and claims is an open term and should be interpreted as "including but not limited to". The subsequent description of the specification is preferred embodiments of the present invention. However, the description takes the general principles of the specification as the objective, and is not intended to limit the scope of the present invention. The protection scope of the present invention is defined by the appended claims.

The present invention relates to a method for producing a high-purity electrolyte by using a toxic waste vanadium catalyst, and in particular, to a method for producing vanadium tetraoxide by using tetravalent vanadium in a waste vanadium catalyst and obtaining a vanadium battery electrolyte.

Embodiment 1

The present invention provides a method for preparing a vanadium battery electrolyte by using a waste vanadium catalyst, including the following steps:

Step A: soak a waste vanadium catalyst in an oxalic acid solution for 2-8 h, to generate a solution containing vanadyl oxalate, where the oxalic acid solution has a mass concentration of 20-50%, and the oxalic acid solution is formed by dissolving oxalic acid in water of 50-100° C.

Step B: clean the waste vanadium catalyst, collect the vanadyl oxalate solution, use clear water to clean the soaked waste vanadium catalyst 1-5 times, and wash out the remaining vanadyl oxalate. The recovery rate of vanadium can reach 97%-99%, and the clear water washing solution can be used as the water for the soaking next time.

Step C: add a polyacid ester into the vanadyl oxalate solution; and after full reaction, remove impurities by filtration, and concentrate the filtrate to obtain a vanadyl oxalate mother solution; further add the waste vanadium catalyst into the vanadyl oxalate mother solution; and after a full reaction, dry the solution at 80-100° C. for 2-3 h to obtain waste vanadium catalyst powder. Send the waste vanadium catalyst powder into a conversion furnace of 480-580° C. for 2-4 h, remove oxalic acid carbon during calcination to make the vanadium catalyst form vanadium pentoxide, and oxidize the waste vanadium catalyst to form a new vanadium catalyst.

Step D: add a sulfuric acid solution into the vanadyl oxalate mother solution, cool the mother solution of vanadyl oxalate ($VOC_2O_4$) and then add sulfuric acid which is 1-3 times the mass of the vanadyl oxalate, to generate a vanadyl sulfate solution ($VOSO_4$), and after filtering, obtain a vanadium electrolyte for preparing a vanadium battery. After the vanadium electrolyte is concentrated, the vanadium ion concentration in the vanadium electrolyte is 1.5-2.2 mol/l, and the stack discharge efficiency of the vanadium electrolyte is 75-85%. The vanadium electrolyte is concentrated and synthesized into a crystal to make solid vanadyl sulfate or make a solid vanadium battery.

Embodiment 2

In this embodiment, a method for preparing a vanadium battery electrolyte by using a waste vanadium catalyst includes the following steps:

Step A: soak a waste vanadium catalyst in an oxalic acid solution for 8 h, to generate a solution containing vanadyl oxalate, where the oxalic acid solution has a mass concentration of 50%, and the oxalic acid solution is formed by dissolving oxalic acid in water of 100° C.

Step B: clean the waste vanadium catalyst, collect the vanadyl oxalate solution, use clear water to clean the soaked waste vanadium catalyst 1-5 times, and wash out the remaining vanadyl oxalate. The recovery rate of vanadium can reach 97%-99%, and the clear water washing solution can be used as the water for the soaking next time.

Step C: add a polyacid ester into the vanadyl oxalate solution; and after full reaction, remove impurities by filtration, and concentrate the filtrate to obtain a vanadyl oxalate mother solution; further add the waste vanadium catalyst into the vanadyl oxalate mother solution; and after a full reaction, dry the solution at 100° C. for 3 h to obtain waste vanadium catalyst powder. Send the waste vanadium catalyst powder into a conversion furnace of 580° C. for calcination for 4 h, remove oxalic acid carbon during calcination to make the vanadium catalyst form vanadium pentoxide, and oxidize the waste vanadium catalyst to form a new vanadium catalyst.

Step D: add a sulfuric acid solution into the vanadyl oxalate mother solution, cool the mother solution of vanadyl oxalate ($VOC_2O_4$) and then add sulfuric acid which is 3 times the mass of the vanadyl oxalate, to generate a vanadyl sulfate solution ($VOSO_4$), and after filtering, obtain a vanadium electrolyte for preparing a vanadium battery. After the vanadium electrolyte is concentrated, the vanadium ion concentration in the vanadium electrolyte is 2.2 mol/l, and the stack discharge efficiency of the vanadium electrolyte is 85%. The vanadium electrolyte is concentrated and synthesized into a crystal to make solid vanadyl sulfate or make a solid vanadium battery.

Embodiment 3

In this embodiment, a method for preparing a vanadium battery electrolyte by using a waste vanadium catalyst includes the following steps:

Step A: soak a waste vanadium catalyst in an oxalic acid solution for 4 h, to generate a solution containing vanadyl oxalate, where the oxalic acid solution has a mass concentration of 25%, and the oxalic acid solution is formed by dissolving oxalic acid in water of 80° C.

Step B: clean the waste vanadium catalyst, collect the vanadyl oxalate solution, use clear water to clean the soaked waste vanadium catalyst 3 times, and wash out the remaining vanadyl oxalate. The recovery rate of vanadium can reach 97%-99%, and the clear water washing solution can be used as the water for the soaking next time.

Step C: add a polyacid ester into the vanadyl oxalate solution; and after full reaction, remove impurities by filtration, and concentrate the filtrate to obtain a vanadyl oxalate mother solution; further add the waste vanadium catalyst into the vanadyl oxalate mother solution; and after a full reaction, dry the solution at 90° C. for 2-3 h to obtain waste vanadium catalyst powder. Send the waste vanadium catalyst powder into a conversion furnace of 530° C. for calcination for 3 h, remove oxalic acid carbon during calcination to make the vanadium catalyst form vanadium pentoxide, and oxidize the waste vanadium catalyst to form a new vanadium catalyst.

Step D: add a sulfuric acid solution into the vanadyl oxalate mother solution, cool the mother solution of vanadyl oxalate ($VOC_2O_4$) and then add sulfuric acid which is 2 times the mass of the vanadyl oxalate, to generate a vanadyl sulfate solution ($VOSO_4$), and after filtering, obtain a vanadium electrolyte for preparing a vanadium battery. After the vanadium electrolyte is concentrated, the vanadium ion concentration in the vanadium electrolyte is 2 mol/l, and the stack discharge efficiency of the vanadium electrolyte is 75-85%. The vanadium electrolyte is concentrated and synthesized into a crystal to make solid vanadyl sulfate or make a solid vanadium battery.

The method for preparing a vanadium battery electrolyte by using a waste vanadium catalyst according to the present invention does not generate wastes which cause environmental pollution in the treatment process, and can make a solution in the waste vanadium catalyst treatment process generate the electrolyte for preparing a vanadium battery. The process is simple and the treatment cost is low.

Although the present invention has been described in detail above with a general description and specific embodiments, some modifications or improvements can be made on the basis of the present invention, which is apparent to those skilled in the art. Therefore, these modifications or improvements made without departing from the spirit of the present invention all fall within the protection scope of the present invention.

What is claimed is:

1. A method for preparing a vanadium battery electrolyte by using a waste vanadium catalyst, comprising the following steps:
   step A: soaking a waste vanadium catalyst in an oxalic acid solution for 2-8 h, to generate a solution containing vanadyl oxalate;
   step B: cleaning the waste vanadium catalyst, and collecting the vanadyl oxalate solution;
   step C: adding a polyacid ester into the vanadyl oxalate solution; and after full reaction, removing impurities by filtration, and concentrating the filtrate to obtain a vanadyl oxalate mother solution; and
   step D: adding a sulfuric acid solution into the vanadyl oxalate mother solution to form a vanadyl sulfate solution, and after filtering, obtaining a vanadium electrolyte for preparing a vanadium battery.

2. The method for preparing a vanadium battery electrolyte by using a waste vanadium catalyst according to claim 1, wherein
    in the step C, a waste vanadium catalyst is further added to the vanadyl oxalate solution, and dried at 80-100° C. to obtain waste vanadium catalyst powder.

3. The method for preparing a vanadium battery electrolyte by using a waste vanadium catalyst according to claim 2, wherein
    the waste vanadium catalyst powder is calcined at 480-580° C. for 2-4 h to obtain a new vanadium catalyst.

4. The method for preparing a vanadium battery electrolyte by using a waste vanadium catalyst according to claim 1, wherein
    in the step A, the oxalic acid solution has a mass concentration of 20-50%, and the oxalic acid solution is formed by dissolving oxalic acid in water of 50-100° C.

5. The method for preparing a vanadium battery electrolyte by using a waste vanadium catalyst according to claim 1, wherein
    vanadium electrolyte has a stack discharge efficiency of 75-85%.

6. The method for preparing a vanadium battery electrolyte by using a waste vanadium catalyst according to claim 1, wherein
    in the step D, sulfuric acid which is 1-3 times the mass of the vanadyl oxalate solution is added.

\* \* \* \* \*